(12) United States Patent
Kusama et al.

(10) Patent No.: US 9,156,994 B2
(45) Date of Patent: Oct. 13, 2015

(54) COATING MATERIALS, MANUFACTURING METHODS THEREOF, AND COATED STRUCTURES

(75) Inventors: Ryoichi Kusama, Toyonaka (JP); Takahisa Kusuura, Kawasaki (JP)

(73) Assignee: Empire Technology Development LLC, Wilmington, DE (US)

( * ) Notice: Subject to any disclaimer, the term of this patent is extended or adjusted under 35 U.S.C. 154(b) by 253 days.

(21) Appl. No.: 13/641,565

(22) PCT Filed: Jun. 4, 2012

(86) PCT No.: PCT/JP2012/003662
§ 371 (c)(1),
(2), (4) Date: Oct. 16, 2012

(87) PCT Pub. No.: WO2013/183080
PCT Pub. Date: Dec. 12, 2013

(65) Prior Publication Data
US 2013/0319292 A1    Dec. 5, 2013

(51) Int. Cl.
*C09D 5/00* (2006.01)
*C09D 5/29* (2006.01)
*C09D 7/12* (2006.01)
*C08K 9/10* (2006.01)

(52) U.S. Cl.
CPC .. *C09D 5/00* (2013.01); *C09D 5/29* (2013.01); *C09D 7/1291* (2013.01); *C08K 9/10* (2013.01)

(58) Field of Classification Search
None
See application file for complete search history.

(56) References Cited

U.S. PATENT DOCUMENTS

| | | | |
|---|---|---|---|
| 4,745,097 A | 5/1988 | Maekawa et al. | |
| 2006/0154046 A1* | 7/2006 | Takahashi et al. | 428/321.5 |
| 2009/0153921 A1 | 6/2009 | Maeyama | |

FOREIGN PATENT DOCUMENTS

| | | |
|---|---|---|
| EP | 0017386 A1 | 10/1980 |
| JP | 55128492 A | 10/1980 |
| JP | 61206689 A | 9/1986 |
| JP | 04313341 A | 11/1992 |
| JP | 5255652 A | 10/1993 |
| JP | 07120331 A | 5/1995 |
| JP | 2000158817 A | 6/2000 |
| JP | 2001001640 A | 1/2001 |
| JP | 2001220530 A | 8/2001 |
| JP | 2006026550 A | 2/2006 |
| JP | 2007033165 A | 2/2007 |
| JP | 2008073574 A | 4/2008 |
| JP | 2008101174 A | 5/2008 |
| JP | 2009145476 A | 7/2009 |
| JP | 2009217106 A | 9/2009 |
| JP | 2011-038913 * | 2/2011 |

(Continued)

OTHER PUBLICATIONS

International Search Report and Written Opinion for PCT/JP2012/003662 dated Aug. 7, 2012.

(Continued)

*Primary Examiner* — Melvin C Mayes
*Assistant Examiner* — Colette Nguyen
(74) *Attorney, Agent, or Firm* — Pepper Hamilton LLP

(57) ABSTRACT

Coating materials that include at least one microcapsule containing a sensing agent, the microcapsule being configured to release the sensing agent in response to stress applied to the microcapsule, and a reactive reagent configured to react with the released sensing agent to develop color are described.

15 Claims, 4 Drawing Sheets

(56) References Cited

FOREIGN PATENT DOCUMENTS

| JP | 2011038913 A | 2/2011 |
|---|---|---|
| WO | WO2005001454 A1 | 1/2005 |

OTHER PUBLICATIONS

Classification of Paint, HP for Sugimoto Painting Co., Ltd., http://www.geocities.jp/penkiya_sugimoto/page/c301_right_toryoubunnrui1.html (Printed from Internet Aug. 20, 2012—Machine Translation).

Electroless Nickel Plating, http://en.wikipedia.org/wiki/Electroless_nickel_plating (Printed from Internet Oct. 12, 2012).

How to Prepare Microcapsules: Laboratory Composite Particles, composite Fine Particle Lab., Faculty of Engineering, Niigata University, http://capsule.eng.niigata-u.ac.jp/lecture/encapsulation01/index.html (Printed from Internet Aug. 20, 2012—Machine Translation).

Medical Supply Interview Form, Mitsubishi Tanabe Pharma Corporation (No English Translation Available), http://di.mt-pharma.co.jp/file/if/f_cek_a.pdf (Oct. 6, 2010).

Ex-Post Evaluation of Policies Pertaining to Special Measures Concerning Taxation etc., Ministry of Economy, Trade and Industry, http://www.meti.go.jp/policy/policy_management/22fy-seisakuhyouka/25-5.pdf (Printed from Internet Oct. 5, 2012—No English Translation Available).

Phenol, http://en.wikipedia.org/wiki/Phenol (Printed from Internet Aug. 20, 2012).

Activated Diffusion Flow Mechanism: Fundamentals Introductory Course Barrier, http://www.soarnol.com/jpn/solution/solution041120.html ((Printed from Internet Aug. 20, 2012—Machine Translation.

Yamaura, Poly(vinyl Alcohol), yet?, *Sen'I Gakkaishi* (2004), 60(10):504-508 (No English Abstract Available).

Zwick et al., Poly(vinyl alcohol)-iodine complexes, *Journal of Applied Polymer Science* (Mar. 9, 2003), 9(7):2393-2424 (Abstract).

Fiji Film Products, http://www.fijifilm.com/products/prescale/guide/qanda/index.html (Printed from Internet Oct. 12, 2012).

Fiji Film Prescale Sheet Type, http://www.fijifilm.com/products/prescale/prescale_sheettype (Printed from Internet Oct. 16, 2012).

Okuma, The particle diameter of the resin and film thickness microcapsules polymerized using microcapsules anti force, *J Jpn Soc Dent Prod* (Dec. 20, 2002), 16(2):25-34 (Abstract) http://jdream2.jst.go.jp/jdream/action/JD71001Disp?APP=jdream&action=reflink&origin=JGLOBAL&versiono=1.0&lang-japanese&db=JMEDPlus&doc=03A0078271&fulllink=no&md5=2beb5e434395b79211ec4843799a463e.

Kiyokawa Plating Top, Plating Technology Electroless Nickel, http://www.kiyokawa.co.jp/technology/technology.asp?hed=13 (Printed from Internet Oct. 12, 2012).

Hazmat Alternatives: Welcome to Hazmat Alternatives, http://web.archive.org/web/20080517094720/http://www.hazmat-alternatives.com/Alt_tech-Chrome-Elec-Ni.php (Printed from Internet Oct. 16, 2012).

FAQs: Pressure Measurement Film (Prescale) I Fujifilm Global, accessed at https://www.fujifilm.com/products/prescale/guide/qanda/index.html, accessed on Oct. 28, 2014, pp. 2.

Wear & Corrosion Alternatives—Cr Plating Alternatives Electroplates, electroless nickel & composite plating, accessed at http://web.archive.org/web/20080517094720/http://www.hazmat-alternatives.com/Alt_tech-Chrome-Elec-Ni.php, accessed at Oct. 28, 2014, pp. 3.

Takahashi, Detection of Fatigue Cracks at Weld Toes by Crack Detection Paint and Surface SH Wave, *Materials Transactions* (May 25, 2007), 48(6):1190-1195.

\* cited by examiner

COATING MATERIALS, MANUFACTURING METHODS THEREOF, AND COATED STRUCTURES

CLAIM OF PRIORITY

This application is a U.S. national stage filing under 35 U.S.C. §371 of International Application No. PCT/JP2012/003662, filed Jun. 4, 2012 and entitled "Coating Materials, Manufacturing Methods Thereof, and Coated Structures," the disclosure of which is incorporated by reference in its entirety.

BACKGROUND

Large structures, such as spherical gas holders storing municipal gas, bridge piers, plant pipelines, and blades of wind turbines, are subjected to periodic non-destructive inspection for deformations, such as cracks, to ensure their safety. However, a conventional non-destructive inspection, such as ultrasonic testing, is costly. For this reason, in many cases, costly non-destructive inspections are scheduled at longer intervals, with less costly visual inspections carried out between the non-destructive inspections.

However, visual inspections have certain shortcomings, such as the possible oversight of microscopic cracks and difficulty in working at heights.

To overcome these shortcomings, for example, an approach involving coloring cracked portions at the time of crack formation has been proposed to prevent the cracked portions from being overlooked during visual inspection. One approach involves paint with microcapsules containing color-developing solutions so that cracked portions are colored as a result of the microcapsules being ruptured at the time of crack formation. With this approach, however, it is still difficult to visually detect microscopic cracks because the extent of infiltration of the color-developing solutions into such microscopic cracked portions is small, resulting in an excessively small colored portion. In order to ensure a larger colored portion despite a small crack, there are at least two common approaches. One is to increase the number of microcapsules used and the other is to enhance the rupture sensitivity of the microcapsules. However, the former approach is not practical due to the inherent nature of the paint involved. The latter approach is not desirable because the microcapsules would be likely to also rupture even when a crack does not occur.

Therefore, there is a demand for a coating material capable of promoting visible reaction not only in a deformed portion but also in the surrounding area thereof when a surface of a structure deforms, so as to increase the size of a colored portion to a visible level, thereby making it easier to visually detect the deformation of the structure.

DETAILED DESCRIPTION

Figure 1:
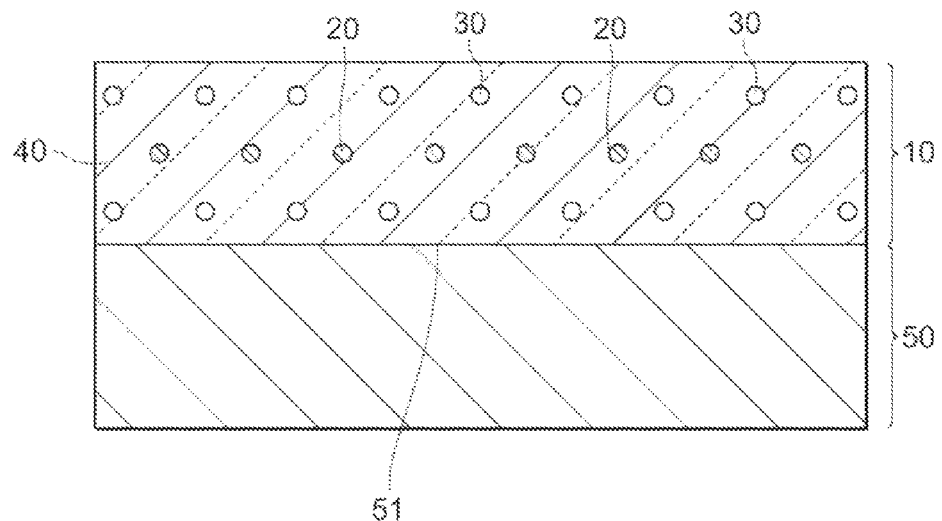
FIG. 1 shows a cross-sectional view of a coating material applied to a surface of a structure in accordance with an embodiment of the present disclosure.

In the following detailed description, reference is made to the accompanying drawings, which form a part hereof. In the drawings, similar symbols typically identify similar components, unless context dictates otherwise. Further, the drawings are intended to be explanatory and may not be drawn to scale. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1 shows a cross-sectional view of a coating material 10 applied to a surface 51 of a structure 50 in accordance with an embodiment of the present disclosure. The coating material 10 may be provided with at least one microcapsule 20, a reactive reagent 30, and a hardenable or solidifiable fluid resin composition 40. The fluid resin composition 40 may include the at least one microcapsule 20 and the reactive reagent 30. For example, the structure 50 may be, but is not limited to being, a spherical gas holder for storing municipal gas, a bridge pier, a plant pipeline, or a blade of a wind turbine.

Figure 2:
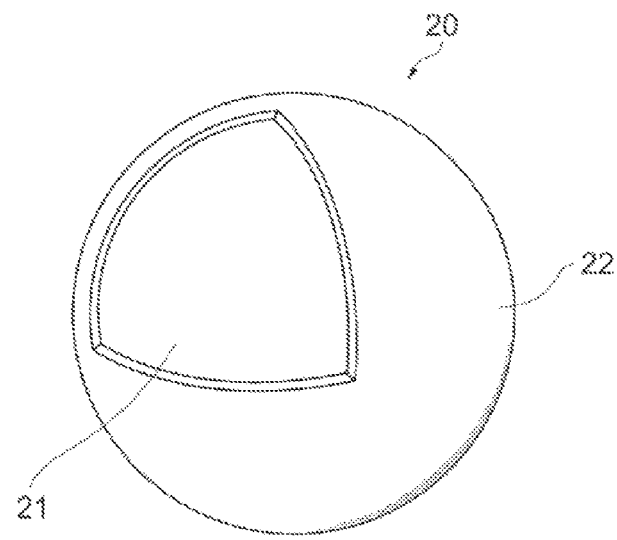
FIG. 2 shows a schematic view of a microcapsule in accordance with an embodiment of the present disclosure.

FIG. 2 shows a schematic view of the microcapsule 20. The microcapsule 20 may be a very small capsule with a diameter of from several micrometers to several hundreds of micrometers. The microcapsule 20 may be provided with a sensing agent 21 contained in a capsular surface 22. The sensing agent 21 may be used for sensing a deformation of the surface 51. Unlike the sensing agent 21, the reactive reagent 30 is not contained in the microcapsule 20. The microcapsule 20 may be configured to release the sensing agent 21 in response to stress applied thereto. The reactive reagent 30 may be configured to react with the released sensing agent 21 to develop color.

Figure 3:
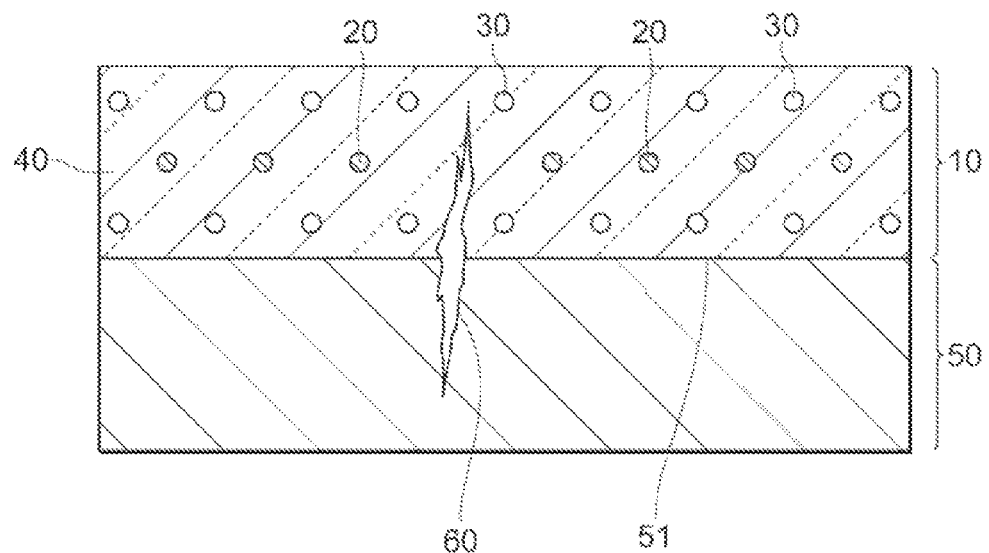
FIG. 3 shows a cross-sectional view of a coating material applied to a surface of a structure in accordance with an embodiment of the present disclosure.
Figure 4:
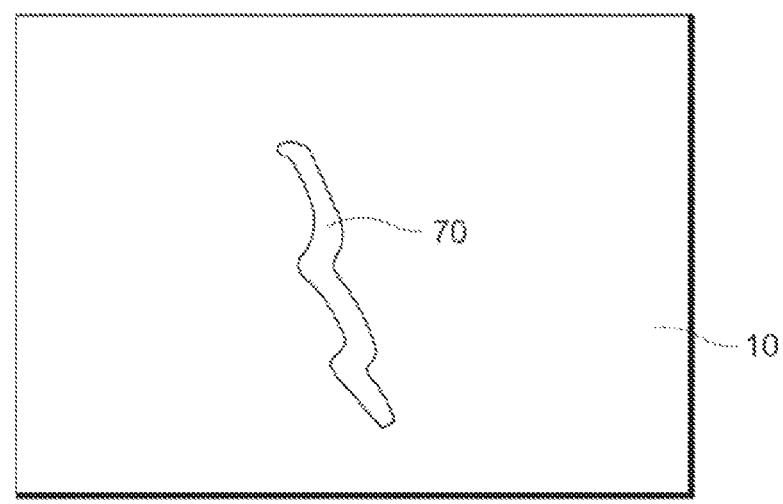
FIG. 4 shows a plan view of a coating material in accordance with an embodiment of the present disclosure.

As shown in FIG. 3, when a crack 60 occurs at the surface 51 as a result of a deformation of the surface 51, stress occurs within the coating material 10 and is then applied to the microcapsule 20. In response to the applied stress, the microcapsule 20 may be damaged or destroyed so as to allow the sensing agent 21 to be released. The sensing agent 21 diffuses through the coating material 10. The reactive reagent 30 reacts with the released sensing agent 21 to develop color. This way, as shown in FIG. 4, due to diffusion of the sensing agent 21, not only a deformed portion of the surface 51 but also a certain area 70 surrounding the deformed portion of the surface 51 can be colored. The colored area 70 grows in size, starting from the deformed portion of the surface 51, through the diffusion of the sensing agent 21. The coating material 10 makes it easier to visually detect even a microscopic crack, which would otherwise be difficult to visually detect by using the conventional art.

Figure 5:
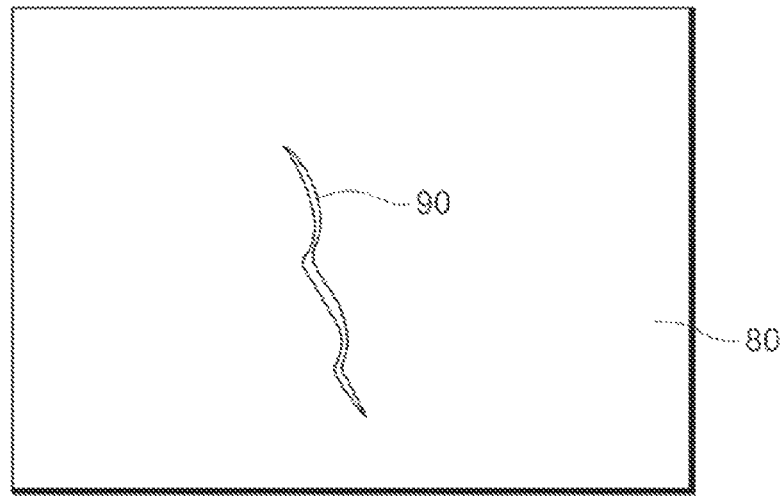
FIG. 5 shows a plan view of a coating material in accordance with a conventional art.

In contrast as shown in FIG. 5, when a coating material 80 in accordance with the conventional art, is used, only a deformed portion 90 can be colored.

In one non-limiting aspect of the present disclosure, to facilitate the diffusion of the sensing agent 21, the microcapsule 20 may be configured to allow the sensing agent 21 to change from a solid or liquid state to a gaseous state in response to the stress applied thereto. For example, a powder of solid iodine can be used as the sensing agent 21, and a powder of water-resistant polyvinyl alcohol can be used as the reactive reagent 30. As is known in the conventional art, the polyvinyl alcohol reacts with the iodine to develop blue color. The microcapsule 20 may be configured to allow iodine molecules to change from a solid state to a gaseous state in response to the stress applied thereto.

The capsular surface 22 covering the sensing agent 21 may have a property whereby the capsular surface 22 does not allow the sensing agents 21 to be released when the surface 51 is not deformed (that is, when no stress is applied to the microcapsule 20) but allows the sensing agents 21 to be released in response to the stress resulting from the deformation of the surface 51. For example, when the powder of solid iodine is used as the sensing agent 21, a nickel plate can be used as the capsular surface 22. Although the solid iodine gradually sublimates at room temperature, the solid iodine, plated with nickel to shield it from the external atmosphere, can be inhibited from sublimating.

When the surface 51 deforms, stress resulting from the deformation of the surface 51 is applied to the microcapsule 20, and as a result of the nickel plate covering the solid iodine being damaged or destroyed, the solid iodine sublimates, thereby releasing iodine gas through the coating material 10. Due to its low molecular weight, the iodine gas diffuses through the fluid resin composition 40 of the coating material 10. As a result, the reactive reagent 30, not only at the deformed portion, but also in the certain area 70 surrounding the deformed portion, reacts with the iodine gas to develop color. Thus, the periphery of the crack 60, which is normally difficult to visually detect can be easily visually detected because the periphery is colored as shown in FIG. 4.

As the coating material 10 makes it possible to visually detect even a microscopic crack in a rapid manner, some non-destructive inspections can be replaced with visual inspections using the coating material 10. This allows costly non-destructive inspections to be scheduled at longer intervals, contributing to a reduction in the cost of inspecting large structures.

Figure 6:
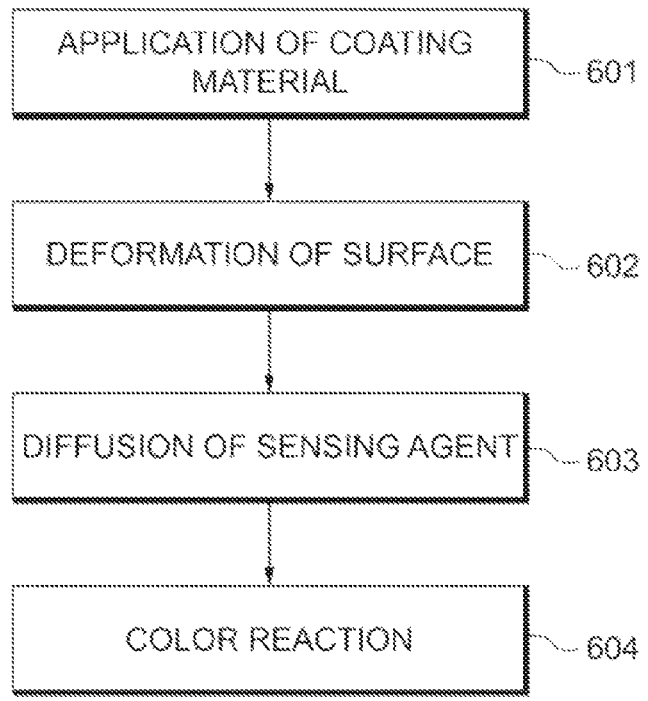
FIG. 6 shows a flowchart showing a method of visually detecting deformed portions in accordance with an embodiment of the present disclosure.

FIG. 6 shows a flowchart showing a method of visually detecting deformed portions in accordance with an embodiment of the present disclosure. First, the coating material 10 is applied to the surface 51 of the structure 50 (step 601). Next, when the surface 51, deforms (step 602), the microcapsule 20 can be damaged or destroyed so as to allow the sensing agent 21 to be released in response to the stress resulting from the deformation of the surface 51. Next, the released sensing agent 21 diffuses through the coating material 10 from the deformed portion to its periphery (step 603). Next, the diffused sensing agent 21 reacts with the reactive reagent 30 to develop color, causing not only the deformed portion but also the certain area 70 surrounding the deformed portion of the surface 51 to be colored (step 604).

Through the above-described flow, even a microscopic crack that is too small to detect with the human eye in normal cases can be easily detected.

The details of the coating material 10 will be explained below.

As outlined above, iodine molecules can be used as the sensing agent 21. The iodine molecules have a property of reacting with the polyvinyl alcohol, thereby developing blue color. Due to the fact that the iodine molecules, which exist in a solid state at room temperature, gradually sublimate into gas, a mechanism for preventing the iodine molecules from sublimating when the surface 51 does not deform and allowing the iodine molecules to sublimate only when the surface 51 deforms may be required.

For this purpose, an entire surface of the solid iodine may be plated with nickel to ensure internal pressure above the saturated vapor pressure by shielding it from the external atmosphere, thus preventing the iodine molecules from sublimating when the surface 51 does not deform. Plating can be achieved by using electroless nickel plating. Due to no electrical power being required, unlike in electroplating, the electroless plating can be applied to an entire surface of the sensing agent 21. Because of its sufficiently soft nature, nickel has the dual advantages of both: (i) preventing the iodine molecules from sublimating when the surface 51 does not deform, and (ii) being damaged or destroyed in response to the stress applied thereto when the surface 51 deforms. In addition, because the nickel plating does not deteriorate during normal use due to, for example, oxidation, the iodine molecules can be preserved in a solid state over an extended period of time. When the surface 51 deforms, the nickel plate covering the entire surface of the solid iodine can be damaged or destroyed in response to the stress resulting from the deformation of the surface 51. As a result, the iodine molecules begin to sublimate and release iodine gas.

As outlined above, the powder of polyvinyl alcohol can be used as the reactive reagent 30. This substance reacts with the iodine molecules and develops blue color. This color reaction helps to detect generated deformations such as cracks. Although normal polyvinyl alcohol is hygroscopic and has the property of dissolving in warm water, it can be endowed with water resistance by chemical cross-linking through a formalization reaction with formaldehyde. Alternatively, polyvinyl alcohol can be endowed with water resistance by repeating several cycles of freezing and thawing or increasing the level of syndiotacticity.

For the fluid resin composition 40, fluid resins which are normally used for a conventional coating material to be applied to structures such as spherical gas holders or bridge piers, can be employed. Such fluid resins may be, for example, based on epoxy, urethane, acryl, nitrocellulose, silicone, or modified silicone. To harden the fluid resin composition 40, its main ingredient may be reactive resin compositions that can be hardened by various means, including, without limitation, heat, moisture, light irradiation, or binary liquid mixing.

Due to its low molecular weight, the iodine gas diffuses through the fluid resin composition 40 such as polymers. Since vaporized iodine gas has an extremely large volume compared with solid iodine, iodine gas can diffuse to a sufficiently large extent even if the deformed portion of the surface is minute. The application of the coating material 10 can be carried out by using conventionally-known methods, such as brush coating, roll coating, and spray coating, as long as the microcapsule 20 can not be damaged or destroyed during the application of the coating material 10 to the surface 51.

If a ratio of the fluid resin composition 40 to the microcapsule 20 becomes higher, coloration when the surface 51 deforms may not be sufficient. In contrast, if the ratio of the fluid resin composition 40 to the microcapsule 20 becomes smaller, the microcapsule 20 may be more likely to be damaged or destroyed when the surface 51 deforms or the application of the coating material 10 to the surface 51 may become more difficult due to high viscosity. Taking this into consideration, the ratio of the fluid resin composition 40 to the microcapsule 20 may be from about one to five to about ten thousand to one by volume, depending on the diameter of the microcapsule 20. As a non-limiting example, the ratio may be four to one by weight or five to two by volume.

In one non-limiting aspect of the present disclosure, the sensing agent 21 may be covered by gum Arabic instead of the nickel plate. The gum Arabic may be used as the capsular surface 22, because the gum Arabic can preserve the sensing agent 21 for an extended period of time, more specifically, for several years.

Methods of manufacturing the microcapsule 20 are roughly classified into an interfacial polymerization method, a coacervation method, an interfacial precipitation method, a drying-in-liquid method, and so forth. In any method, the working principle is that atomized core materials are dispersed in an appropriate medium, and then a coating of minute particles is formed. Coacervation methods can be used to exploit phase separation and a surface chemical change based on the phase separation when employed in combination.

A combination of the sensing agent 21 and the reactive reagent 30 may be realized in the form of a color reaction among ammonia gas, phosphoric acid, and reactants of cuprous oxide. More specifically, ammonia pressurized into a liquid can be used as the sensing agent 21. In addition, a fine powder of phosphoric acid and reactants of cuprous oxide can be used as the reactive reagent 30. This substance reacts with ammonia gas, resulting in formation of a deep blue color. When liquid ammonia is used as the sensing agent 21, a pressure of more than 0.857 MPa at a temperature of 20 degrees Celsius may be used in order to remain in a liquid state. The microcapsule 20 made of gum Arabic may have sufficient pressure resistance. When the surface 51 deforms, the stress is applied to the microcapsule 20, which causes the microcapsule 20 to be destroyed or damaged. As a result, this evaporates the liquefied ammonia out of the microcapsule 20. As the ammonia gas has a low molecular weight, it diffuses through the coating material 10. Consequently, the reactive reagent 30 can be colored in deep blue, not only at the deformed portion, but also around the periphery of the deformed portion.

Alternatively, salicylic acid and an aqueous solution of iron chloride (III) also exhibit a color reaction and may be used as the sensing agent 21 and the reactive reagent 30, respectively.

Figure 7:
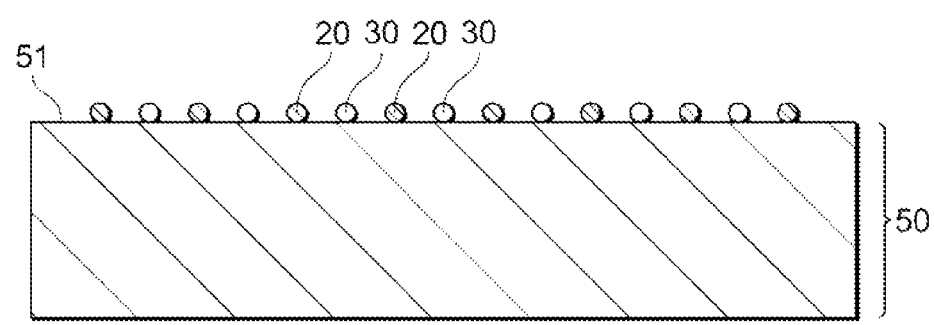
FIG. 7 shows a cross-sectional view of microcapsules and reactive reagents dispersed throughout a surface of a structure in accordance with an embodiment of the present disclosure.

In one non-limiting aspect of the present disclosure, as shown in FIG. 7, a plurality of microcapsules 20 and a plurality of reactive reagents 30 may be dispersed throughout the surface 51 of the structure 50. The reactive reagent 30 is not contained in the microcapsule 20. When the surface 51 deforms, the stress resulting from the deformation of the surface 51 is applied to the microcapsule 20 on the deformed portion. As a result, the microcapsule 20 may be damaged or destroyed so as to allow the sensing agent 21 in the gaseous state to be released. The released sensing agent 21 diffuses through the atmosphere from the deformed portion to its periphery. The diffused sensing agent 21 reacts with the reactive reagent 30 to develop color, causing not only the deformed portion but also the certain area 70 surrounding the deformed portion of the surface 51 to be colored.

An effect of the embodiment of the present disclosure is that even a microscopic crack, which has previously been difficult to visually detect, may be visually detected more easily as a result of the sensing agent 21 being released when the surface 51 deforms and of the reactive reagent 30 being configured to react with the released sensing agent 21 to develop color.

This effect may provide the following two advantages. One is that, a microscopic crack may be visually detected more easily. In some techniques, the deformed portion may be colored when microcapsules containing a color developing solution rupture at the time of cracking, thus allowing the crack to be detected. With this technique, however, the molecules used for coloration have a relatively large molecular weight and are less likely to diffuse in a coating material, remaining in a small area around the crack. For this reason, the colored area is essentially the same size as the crack itself, with both being small when the crack itself is small. Therefore, a microscopic crack is difficult to visually detect. In contrast, with the embodiments of the present disclosure, the sensing agent 21 contained in the microcapsule 20 diffuses over a large area, starting from the deformed portion, and causes the reactive reagent 30, not only in the deformed portion, but also in the surroundings thereof, to develop color, thus allowing even a microscopic crack to be visually detected more easily. This may allow a structure to be visually inspected for microscopic cracks.

The other advantage lies in the fact that non-destructive inspection can be scheduled at longer intervals because less costly visual inspection will have become more accurate, thereby reducing the cost for inspecting a large structure. Conventionally, non-destructive inspection requiring special devices is needed to inspect microscopic cracks. Since it is difficult to visually detect a microscopic crack, it is necessary to carry out costly non-destructive inspections on a regular basis even when less costly visual inspection is used in combination. With the embodiment of the present disclosure, on the other hand, due to the fact that microscopic cracks can be visually detected, costly inspection processes, other than visual detection, can be scheduled at longer intervals, leading to the advantage of reducing inspection costs.

EXAMPLES

Example 1

Preparation of a Coating Material

Solid iodine was reduced, at room temperature, to powder having an average particle diameter of 30 micrometers. Next, an aqueous solution of palladium sulfate ($PdSO_4$:0.080% by weight; $H_2SO_4$ 22% by weight; $H_2O$ 77.92% by weight) was prepared as a catalytic solution, and then the powder of solid iodine was sprayed with the catalytic solution to form a catalytic layer on an entire surface thereof. Next, the powder of solid iodine coated with the catalytic layer was immersed and stirred in an electroless nickel-phosphorus plating solution until a nickel-phosphorus plating film reached a thickness of 5 micrometers, at a temperature of about 35 degrees Celsius and at a PH of about 7, to form the microcapsules 20.

Next, in preparation for the reactive reagent 30, a commercially available polyvinyl alcohol gel was reduced to powder. Also, in preparation for the fluid resin composition 40, a commercially available epoxy resin paint designed for a construction paint was used. Then, the microcapsules 20 and the reactive reagent 30 were combined with the fluid resin composition 40 to prepare the coating material 10 such that a ratio between the microcapsules 20, the reactive reagent 30 and the fluid resin composition 40 was adjusted to be about one to one to ten by volume.

Example 2

Preparation of a Coated Structure

Using a spray gun, the coating material 10 prepared through Example 1 was applied as a base coat to a surface of a steel plate having a thickness of about 10 millimeters, used for a bridge structure. The thickness of the coating material 10 was adjusted to about 0.5 millimeters. By proceeding in this manner, as shown in FIG. 1, the coated structure 50 was prepared.

Example 3

Detection of Stress

Upon repeatedly applying tension stress to the coated structure 50 prepared through Example 2, fatigue cracks occurred on the surface of the coated structure 50, causing the sensing agent 21 to react with the reactive reagent 30. As a result, an elongated area surrounding the cracked portions became blue colored.

Example 4

Preparation of Another Coating Material

Ammonia was dissolved in water to prepare an aqueous solution of ammonia having a concentration of 0.1 M. Next, isooctane and sorbitan monooleate were mixed with polymethylmethacrylate dissolved in dichloromethane to prepare an organic layer. This organic layer was mixed, while being stirred, with the prepared aqueous solution of ammonia so as to form an emulsion liquid. Gum Arabic dissolved in water was mixed with the prepared emulsion liquid at a temperature of about 45 degrees Celsius. An acetic acid aqueous solution was added to the emulsion liquid until its pH was adjusted to about 4.9. After cooling the emulsion liquid to about 10 degrees Celsius, a glutaraldehyde solution was added, while being stirred, to the emulsion liquid, at room temperature for about eight hours, to prepare a slurry of microcapsules. This slurry was filtered and dried to form the microcapsules 20.

Next, in preparation for the reactive reagent 30, after heating a phosphating solution to a temperature of about 80 degrees Celsius under a nitrogen atmosphere, powder of cuprous oxide was added, while being stirred, to the phosphating solution so as to form a reaction solution. After that, particles of porous silica were added, while being stirred for about five minutes, to the prepared reaction solution. By proceeding in this manner, the reaction solution sank through the particles of porous silica. Using a thermostatic chamber, the particles of porous silica were dried, under a nitrogen atmosphere at a temperature of from about 50 degrees Celsius to about 70 degrees Celsius, to form the reactive reagent 30. Also, in preparation for the fluid resin composition 40, a commercially available epoxy resin paint designed for a construction paint was used. Then, the microcapsules 20 and the reactive reagent 30 were combined with the fluid resin composition 40 to prepare the coating material 10 such that a ratio between the microcapsules 20, the reactive reagent 30 and the fluid resin composition 40 was adjusted to be about one to one to ten by volume.

Example 5

Preparation of Another Coated Structure

The microcapsules 20 prepared through Example 1 were added to an aqueous solution of polyvinyl alcohol. Using a spray gun, the aqueous solution of polyvinyl alcohol including the microcapsules 20 was applied to a surface of a steel plate having a thickness of about 10 millimeters, used for a bridge structure. By proceeding in this manner, as shown in FIG. 7, the coated structure 50 was prepared.

While the present disclosure has been described with respect to a limited number of embodiments, a person skilled in the art, having the benefit of this disclosure, would appreciate that other embodiments can be devised which do not depart from the scope of the present disclosure as disclosed herein. Accordingly, the scope of the invention should be limited only by the attached claims.

The invention claimed is:

1. A coating material comprising:
at least one microcapsule containing a sensing agent in a solid state, the microcapsule being configured to allow the sensing agent to change from the solid state to a gaseous state upon sublimation and release the sensing agent in response to a stress applied to the microcapsule; and
a reactive reagent configured to react with the released sensing agent to develop color, wherein the reactive reagent is not contained in the microcapsule.

2. The coating material of claim 1, wherein the at least one microcapsule is configured to be damaged or destroyed so as to allow the sensing agent to be released in the gaseous state in response to the applied stress.

3. The coating material of claim 1, wherein a deformation of a structure surface to which the coating material is applied results in the stress.

4. The coating material of claim 3, wherein the coating material is configured to visually detect a microscopic crack on the structure surface to which the coating material is applied.

5. The coating material of claim 1, further comprising a hardenable or solidifiable fluid resin composition, wherein a ratio of the fluid resin composition to the microcapsule is from about one to five to about ten thousand to one by volume.

6. The coating material of claim 5, wherein the fluid resin composition is an epoxy resin, an urethane resin, an acrylic resin, a nitrocellulose resin, a silicone resin, a modified silicone resin, or any combination thereof.

7. The coating material of claim 1, wherein the sensing agent comprises iodine molecules.

8. The coating material of claim 7, wherein the reactive reagent comprises polyvinyl alcohol.

9. The coating material of claim 7, wherein the microcapsule is plated with nickel.

10. The coating material of claim 1, wherein the at least one microcapsule has a diameter of about 10 micrometers to about 100 micrometers.

11. The coating material of claim 1, wherein the at least one microcapsule is resistant to damage during application of the coating material.

12. A structure comprising:
a surface; and
a coating material applied to the surface, the coating material comprising: at least one microcapsule containing a sensing agent in a solid state, the microcapsule being configured to allow the sensing agent to change from the solid to a gaseous state upon sublimation and release the sensing agent in response to a stress applied to the microcapsule, the stress resulting from a deformation of the surface; and a reactive reagent configured to react with the released sensing agent to develop color, wherein the reactive reagent is not contained in the microcapsule.

13. The structure of claim 12, wherein an area surrounding the deformation of the surface is colored.

14. A structure comprising:
a surface;
a plurality of microcapsules dispersed throughout the surface, wherein each of the plurality of microcapsules contains a sensing agent in a solid state and is configured to allow the sensing agent to change from the solid state to a gaseous state upon sublimation and release the sensing agent in response to a stress applied to the microcapsule, the stress resulting from a deformation of the surface; and
a plurality of reactive reagents dispersed throughout the surface, wherein each of the plurality of reactive reagents is configured to react with the released sensing agent to develop color, the reactive reagent not being contained in the microcapsule.

15. A method of manufacturing a coating material, the method comprising:
providing a hardenable or solidifiable fluid resin composition;
providing at least one microcapsule containing a sensing agent in a solid state, the microcapsule being configured to allow the sensing agent to change from the solid to a gaseous state upon sublimation and release the sensing agent through the fluid resin composition in response to a stress applied to the microcapsule;
providing a reactive reagent configured to react with the released sensing agent to develop color, wherein the reactive reagent is not contained in the microcapsule; and
combining the fluid resin composition with the microcapsule and the reactive reagent to produce the coating material.

* * * * *

UNITED STATES PATENT AND TRADEMARK OFFICE
CERTIFICATE OF CORRECTION

PATENT NO. : 9,156,994 B2  
APPLICATION NO. : 13/641565  
DATED : October 13, 2015  
INVENTOR(S) : Kusama et al.

It is certified that error appears in the above-identified patent and that said Letters Patent is hereby corrected as shown below:

In the Specification

In Column 1, Line 8, delete "§371" and insert -- § 371 --, therefor.

In Column 2, Line 65, delete "contrast as" and insert -- contrast, as --, therefor.

In Column 5, Line 67, delete "that," and insert -- that --, therefor.

In the Claims

In Column 8, Line 60, in Claim 12, delete "solid to" and insert -- solid state to --, therefor.

In Column 9, Line 22, in Claim 15, delete "solid to" and insert -- solid state to --, therefor.

Signed and Sealed this  
Twenty-eighth Day of June, 2016

Michelle K. Lee  
*Director of the United States Patent and Trademark Office*